(12) United States Patent
Takeuchi et al.

(10) Patent No.: US 10,865,839 B2
(45) Date of Patent: Dec. 15, 2020

(54) CLUTCH CONTROL DEVICE AND CLUTCH CONTROL METHOD

(71) Applicant: Knorr-Bremse Commercial Vehicle Systems Japan Ltd., Sakado (JP)

(72) Inventors: Junya Takeuchi, Sakado (JP); Takuya Nagase, Sakado (JP)

(73) Assignee: KNORR-BREMSE Commercial Vehicle Systems Japan Ltd., Sakado (JP)

( * ) Notice: Subject to any disclaimer, the term of this patent is extended or adjusted under 35 U.S.C. 154(b) by 0 days.

(21) Appl. No.: 16/283,376

(22) Filed: Feb. 22, 2019

(65) Prior Publication Data

US 2019/0186563 A1     Jun. 20, 2019

Related U.S. Application Data

(63) Continuation of application No. PCT/JP2017/030370, filed on Aug. 24, 2017.

(30) Foreign Application Priority Data

Aug. 25, 2016 (JP) .................. 2016-165165

(51) Int. Cl.
*F16D 48/06* (2006.01)
*F16D 48/02* (2006.01)
*F16D 25/00* (2006.01)

(52) U.S. Cl.
CPC ............ *F16D 48/06* (2013.01); *F16D 48/02* (2013.01); *F16D 25/00* (2013.01); *F16D 2500/104* (2013.01); *F16D 2500/3067* (2013.01)

(58) Field of Classification Search
CPC .. F16D 48/02; F16D 48/06; F16D 2500/1028; F16D 2500/7041;

(Continued)

(56) References Cited

U.S. PATENT DOCUMENTS

| | | | |
|---|---|---|---|
| 6,171,212 B1 | 1/2001 | Reuschel | |
| 2004/0045784 A1* | 3/2004 | Ebert | F16D 25/14 192/48.601 |

(Continued)

FOREIGN PATENT DOCUMENTS

| | | |
|---|---|---|
| JP | 50-155881 A | 12/1975 |
| JP | 5-233074 A | 9/1993 |

(Continued)

OTHER PUBLICATIONS

Extended European Search Report issued in European Application No. 17843692.9 dated Mar. 16, 2020 (seven (7) pages).

(Continued)

*Primary Examiner* — Edwin A Young
(74) *Attorney, Agent, or Firm* — Crowell & Moring LLP

(57) ABSTRACT

A clutch control device and a clutch control method are capable of preventing progress of wear and damage of a pneumatic clutch actuator. The clutch control device that controls the operation of a pneumatic clutch actuator to disconnect a clutch is characterized by setting a stroke amount of a piston corresponding to a disconnection position of the clutch as a final target stroke amount, setting other stroke amounts different from the final target stroke amount as intermediate target stroke amounts, and controlling the operation of the piston in a stepwise manner such that an actual stroke amount of the piston is matched with the intermediate target stroke amounts and is thereafter matched with the final target stroke amount, thereby disconnecting the clutch.

4 Claims, 6 Drawing Sheets

(58) Field of Classification Search
CPC . F16D 2500/70414; F16D 2500/70416; F16D 2500/70626
See application file for complete search history.

(56) References Cited

U.S. PATENT DOCUMENTS

| | | | |
|---|---|---|---|
| 2004/0260444 | A1* | 12/2004 | Winkelmann .......... F16D 48/06 701/67 |
| 2006/0116237 | A1* | 6/2006 | Knoblauch .......... F16D 25/088 477/73 |
| 2011/0168011 | A1 | 7/2011 | Takei et al. |

FOREIGN PATENT DOCUMENTS

| | | |
|---|---|---|
| JP | 8-36411 A | 2/1996 |
| JP | 9-166160 A | 6/1997 |
| JP | 11-132262 A | 5/1999 |
| JP | 2001-99287 A | 4/2001 |
| JP | 2004-21309 A | 1/2004 |
| JP | 2007-24277 A | 2/2007 |
| JP | 2012-112496 A | 6/2012 |
| JP | 2016-23668 A | 2/2016 |

OTHER PUBLICATIONS

International Search Report (PCT/ISA/210) issued in PCT Application No. PCT/JP2017/030370 dated Nov. 7, 2017 with English translation (four (4) pages).
Japanese-language Written Opinion (PCT/ISA/237) issued in PCT Application No. PCT/JP2017/030370 dated Nov. 7, 2017 (four (4) pages).

* cited by examiner

ＵＳ 10,865,839 B2

CLUTCH CONTROL DEVICE AND CLUTCH CONTROL METHOD

CROSS REFERENCE TO RELATED APPLICATIONS

This application is a continuation of PCT International Application No. PCT/JP2017/030370, filed Aug. 24, 2017, which claims priority under 35 U.S.C. § 119 from Japanese Patent Application No. 2016-165165, filed Aug. 25, 2016, the entire disclosures of which are herein expressly incorporated by reference.

BACKGROUND AND SUMMARY OF THE INVENTION

The present invention relates to a clutch control device and a clutch control method, particularly to a clutch control device and a clutch control method which are suitable for controlling a pneumatic clutch actuator to connect and disconnect a clutch.

Hitherto, a clutch control device is available, which controls the clutch actuator of the pneumatic clutch, thereby to connect or disconnect the clutch. The clutch control device is an electronic control device called ECU (Electronic Control Unit) or TCU (Transmission Control Unit).

The clutch control device is configured to automatically control a plurality of solenoid valves arranged in the clutch actuator, in accordance with the present shift position, accelerator opening, engine speed, and the like, thereby to control the opening/closing of the solenoid valves without the driver's manipulation.

The clutch actuator comprises an intake solenoid valve and an exhaust solenoid valve. These solenoid valves are opened and closed, independently of each other, in accordance with the signals coming from the clutch control device. As the solenoid values are so opened and closed, compressed air is supplied from an air tank to the clutch actuator. Further, the air supplied from the clutch actuator is exhausted outside.

For example, the clutch actuator opens the intake solenoid valve and keeps the exhaust solenoid valve closed. In this case, air is supplied to the clutch actuator from the air tank. The pressure (i.e., air pressure) in the clutch actuator therefore rises, moving the piston in the clutch actuator. The clutch can thereby be disconnected.

The clutch actuator keeps closing the intake solenoid valve, and opens the exhaust solenoid valve. The air taken in is therefore released outside, the air pressure in the clutch actuator is thereby lowered, and the piston moves back to the initial position. The clutch can therefore be connected.

If the clutch actuator is a pneumatic one, a time lag exists between the timing of outputting a control signal from the clutch control device and the timing of operating the clutch actuator with a prescribed air pressure in response to the control signal. That is, the clutch actuator operates on the basis of a control signal output before the present time.

Most clutch control devices employ a feedback controller called PIDC (Proportional Integral differential controller). The PIDC controls the operation of the clutch actuator. Hence, if the clutch actuator operates with a time delay, the clutch may not be connected or disconnected with high precision.

More specifically, the stroke amount of the piston moved with the air pressure in the clutch actuator may not be changed with high precision. If this is the case, the piston will move farther from the clutch-connecting position or from the clutch-disconnecting position, inevitably causing an over-shoot or an under-shoot, respectively. Consequently, the clutch actuator (the piston in particular) will be worn or damaged.

JP 2016-23668 A discloses a clutch control device in which the pneumatic clutch actuator is operated under PID-control. In this clutch control device, if the piston undergoes over-shoot or under-shoot in the clutch actuator, the PID control is stopped, the I-item value (i.e., integrated item of the PID control) is initialized, and the PID control is resumed upon the lapse of a prescribed time.

In the invention disclosed in JP 2016-23668 A, the change in the stroke amount of the piston is suppressed after the piston undergoes over-shoot or under-shoot, and the stroke amount of the piston can thereby be fast reduced to the target stroke amount.

To achieve the object mentioned above, a clutch control device according to this invention configured to control a pneumatic clutch actuator, thereby to connect and disconnect a clutch. The clutch control device is characterized in that the stroke amount of a piston corresponding to a disconnecting position of the clutch is set as a final target stroke amount, other stroke amounts different from the final target stroke amount are set as intermediate target stroke amounts, and the piston is controlled in a stepwise manner such that an actual stroke amount of the piston is matched with the intermediate target stroke amounts and is thereafter matched with the final target stroke amount, thereby disconnecting the clutch.

In the clutch control device and the clutch control method, both according to this invention, the pneumatic clutch actuator is controlled, connecting or disconnecting the clutch. This prevents the progression of wear and damage in the pneumatic clutch actuator, which may otherwise accompany the over-shoot or under-shoot of the piston.

Other objects, advantages and novel features of the present invention will become apparent from the following detailed description of one or more preferred embodiments when considered in conjunction with the accompanying drawings.

DETAILED DESCRIPTION OF THE DRAWINGS

An embodiment of the present invention will be described with reference to the drawings. The embodiment described below is no more than one embodiment of the invention, and this invention is not limited to this embodiment.

(1) Overall Configuration

Figure 1:
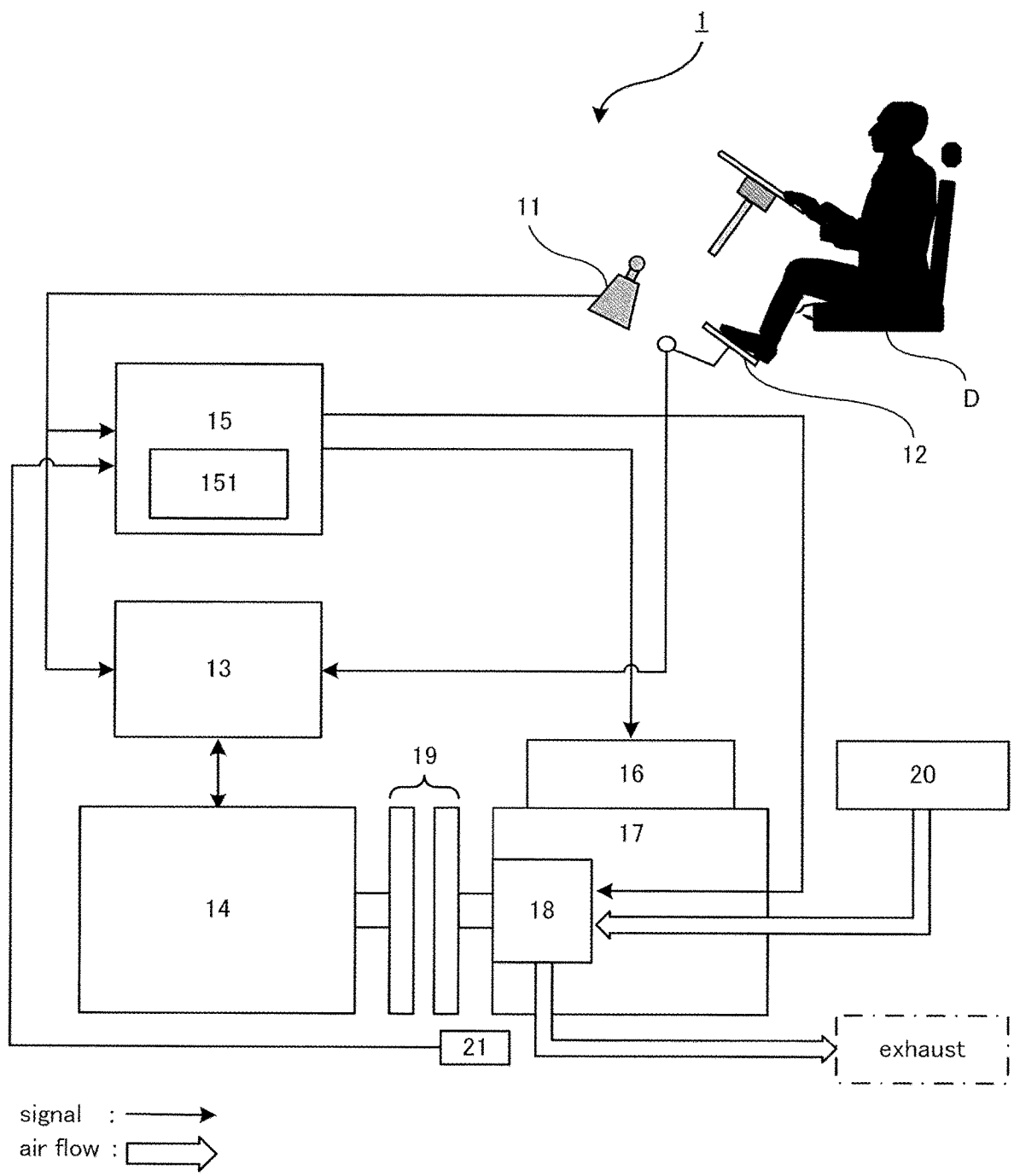
FIG. 1 is a diagram illustrating the overall configuration of a transmission system.

FIG. 1 shows the overall configuration of the transmission system 1 of the embodiment. The transmission system 1 is a system that controls the operation related to the changes in vehicle speed. It is, for example, an AMT (Automatic Manual Transmission) system that automatically connects and disconnects the clutch, irrespective of clutch manipulation by a driver D.

The driver D may change over the change lever unit 11 and may then step on the accelerator pedal 12. Then, the change lever unit 11 generates a change-lever position signal, and the accelerator pedal 12 generates an accelerator-pedal opening signal. The change lever unit 11 and the accelerator pedal 12 output these signals to an engine control unit (ECU: Engine Control Unit) 13.

The ECU 13 is an electronic control device comprising a processor, a memory, etc., and is designed to control the overall operation of the engine 14. The ECU 13 receives, for example, a position signal from the change lever unit 11 and an opening signal from the accelerator pedal 12. In this embodiment, the ECU 13 performs an overall control on the engine 14 in accordance with these signals and the detection signals (including the signal showing the current speed of the vehicle) coming from various sensors (not shown).

The clutch control device 15 is an electronic control device which comprises a processor 151 and a memory and which is designed to control the operation of a transmission 17 via a gear shift unit 16. The clutch control device 15 is called also "transmission control unit (TCU)".

If the clutch control device 15 receives the position signal and opening signal, it controls the transmission 17, as the ECU 13 does, in accordance with these signals and the detection signals coming from the various sensors (not shown).

The clutch control device 15 used in this embodiment controls the operation of the pneumatic clutch actuator 18, thereby connecting or disconnecting a clutch 19. The clutch 19 is usually connected by means of a bias means such as a clutch spring (not shown) or a diaphragm (not shown), and is disconnected when compressed air is supplied from an air tank 20 to the clutch actuator 18.

Since the clutch actuator 18 is a pneumatic actuator, the clutch control device 15 controls the plurality of solenoid valves arranged in the clutch actuator 18 in order to supply air from the air tank 20 to the clutch actuator 18 or to release the air from the clutch actuator 18.

When the solenoid valves arranged in the clutch actuator 18 open or close, the piston provided in the clutch actuator 18 is moved in the axial direction by the pressure of air (i.e., air pressure). The stroke amount of the piston (i.e., actual stroke amount) is detected by a sensor 21. A signal representing the actual stroke amount is output to the clutch control device 15.

The clutch control device 15 according to this embodiment controls the clutch actuator 18 by means of the feedback control called "proportional integral differential controller). On receiving the actual stroke amount from the sensor 21, the clutch control device 15 calculates a stroke amount (designated stroke amount) for the piston, from the difference between the actual stroke amount and the desired stroke amount (target stroke amount). Then, the clutch control device 15 outputs the stoke amount so calculated, as a valve driving signal, to the clutch actuator 18. The opening of each solenoid valves is thereby controlled.

(2) Configuration of the Clutch Actuator

Figure 2:
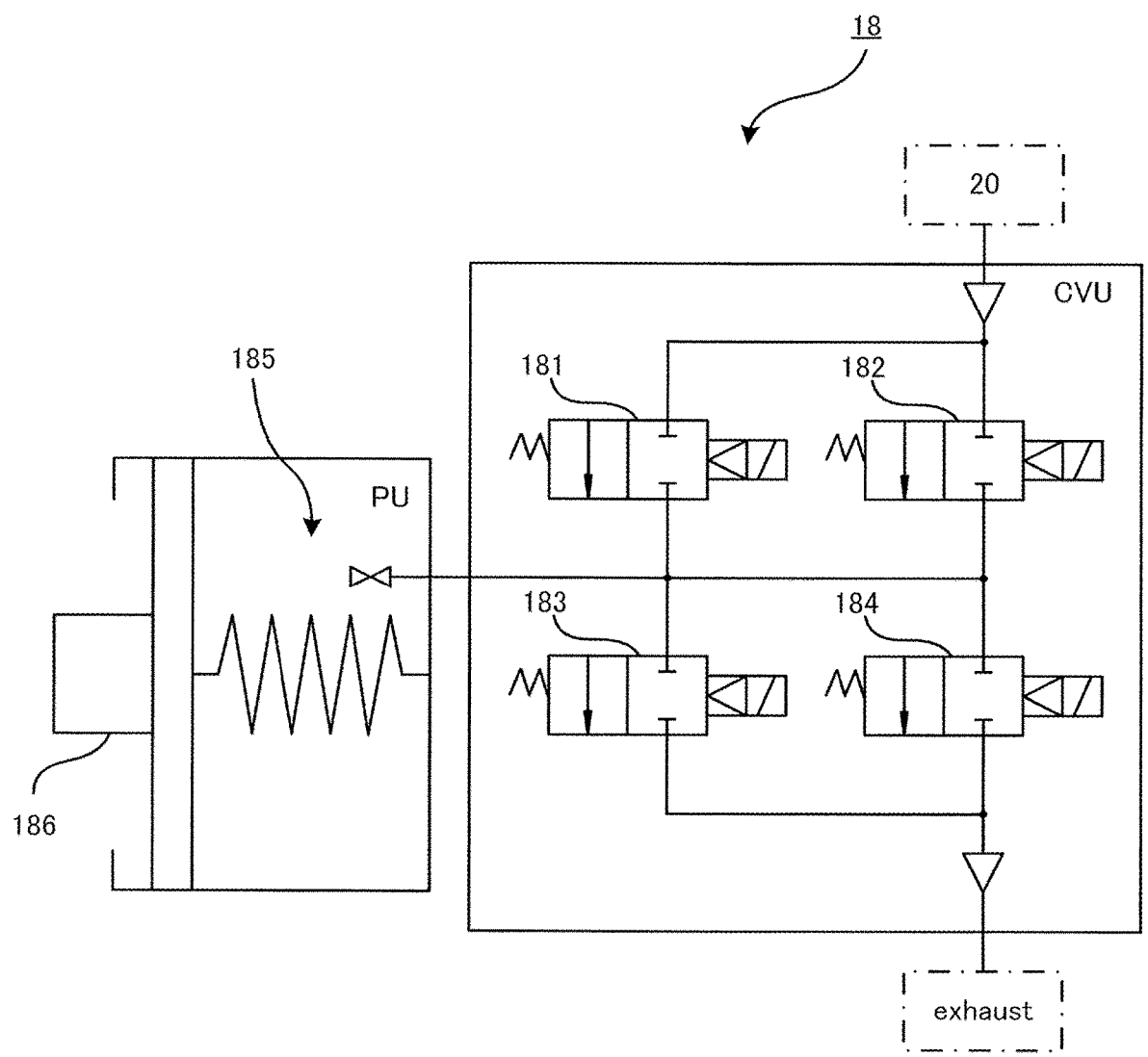
FIG. 2 is a schematic diagram showing the configuration of a clutch actuator.

FIG. 2 shows the conceptual configuration of the clutch actuator 18. The clutch actuator 18 is composed of a clutch valve unit CVU having a plurality of solenoid valves 181 to 184, and a piston unit PU having an air chamber 185 and a piston 186.

The solenoid valves 181 and 182 are solenoid valves for supplying air, and remain closed while the engine 14 of the vehicle is not ON. When the engine 14 is turned on, a valve driving signal is input from the clutch control device 15, the solenoid valve 181 or the solenoid valve 182 opens, or both valves 181 and 182 open. Then, air is supplied from the air tank 20 to the air chamber 185 through the solenoid valve 181 or solenoid valve 182, or through both solenoid valves 181 and 182.

The solenoid valves 181 and 182 differ in terms of air flow rate while they remain open. In this embodiment, the air flow rate in the solenoid valve 181 is higher than the air flow rate in the solenoid valve 182. Hence, more air is supplied from the air tank 20 into the air chamber 185 through the solenoid valve 181 than through the solenoid valve 182.

The solenoid valves 183 and 184 are solenoid valves for releasing air outside, and remain closed while the engine 14 of the vehicle is not ON. When the engine 14 is switched on, a valve driving signal is input from the clutch control device 15, and the solenoid valve 183 or the solenoid valve 184 opens or both valves 183 and 184 open. Then, air is released outside from the air chamber 185 through the valve 183 or the valve 184, or through both values 183 and 184.

The solenoid valves 183 and 184 differ in terms of air flow rate while they remain open. In this embodiment, the air flow rate in the solenoid valve 183 is higher than the air flow rate in the solenoid valve 184. Therefore, more air is exhausted from the air chamber 185 through the solenoid valve 183 than through the solenoid valve 184.

If the engine of the vehicle is turned on, the clutch control device 15 opens the solenoid valves 181 and 182, while the solenoid valves 183 and 184 remain closed. In this case, air is supplied from the air tank 20 into the air chamber 185 through the opened solenoid valve 181 or 182.

As the pressure of the air supplied into the air chamber 185 rises, the piston 186 is moved in axial direction (to the left, in this case) against the bias of the clutch spring (not shown) or diaphragm (not shown). As the piston 186 is moved to the left, the clutch 19 is disconnected.

On the other hand, the clutch control device 15 may close the solenoid valves 181 and 182 and may open the solenoid valves 183 and 184. In this case, the air is released from the air chamber 185 through the solenoid valves 183 and 184.

When the air is released from the air chamber 185, the air pressure falls in the air chamber 185. When the bias pushing the clutch spring, diaphragm and the like (not shown) rightward increases greater than the force the air exerts on the piston 186 leftward, the piston 186 moves to the right. In this case, the clutch 19 is connected.

The clutch control device 15 can open or close the solenoid valves 181, 182, 183 and 184, independently of one another. For example, the clutch control device 15 can open only the solenoid valve 182 which has a small opening, while closing the solenoid valves 181 which has a large opening.

If this is the case, air can be slowly supplied into the air chamber 185, and the speed at which the piston 186 is moved to the left can therefore be decreased. If both the solenoid valves 181 and 182 are opened, air can be fast supplied into the air chamber 185. In this case, the piston 186 can be moved to the left at high speed.

Figure 3:
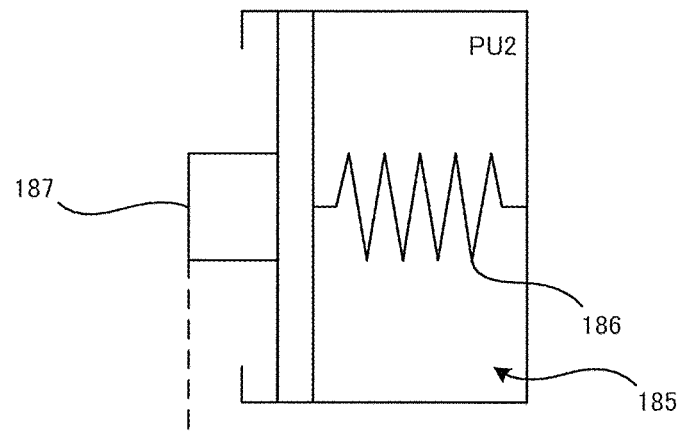
FIG. 3 is a diagram explaining various stroke amounts the piston may assume.
Figure 3:
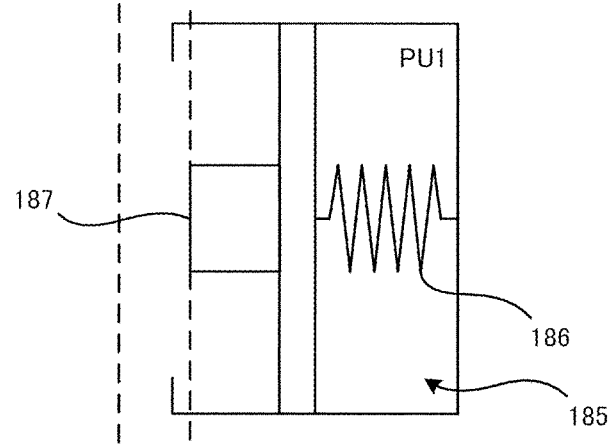
Figure 3:
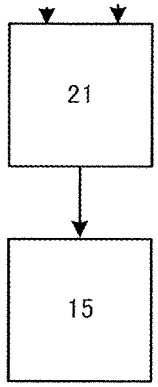

FIG. 3 is a diagram that explains various stroke amounts that the piston may assume. The piston unit PU1 assumes the position shown, when the clutch 19 is connected (namely, when the clutch assumes the connected position). The piston unit PU2 assumes the position shown, when the clutch 19 is disconnected (namely, when the clutch assumes the disconnected position).

While the piston unit PU1 remains connected to the clutch, the solenoid valves 181 and 182 for supplying air are closed. While the solenoid valves 183 and 184 for releasing air remain open, the air is released outside from the air chamber 185.

Hence, the air pressure in the air chamber 185 is lower than the prescribed value, and is smaller than the bias of the latch spring and the bias of the diaphragm. In this case, the distal end of the piston 186 takes the reference position (where the stroke amount=0). The sensor 21 outputs a signal representing the stroke amount, as signal representing the actual stroke amount, to the clutch control device 15.

On the other hand, in the piston unit PU2 indicating the clutch disconnecting position, the solenoid valves 181 and 182 for supplying air are opened. If the solenoid valves 183 and 184 for releasing air remain closed, the air is supplied into the air chamber 185 through the solenoid valves 181 and 182.

In this case, the piston 186 is therefore pneumatically moved in the axial direction against the bias of the clutch spring (not shown) or the bias of the diaphragm (not shown). At this time, the distal end of the piston 186 exists at distance X from the reference position (that is, stroke amount=X). The sensor 21 outputs, to the clutch control device 15, a signal representing the stoke amount at this time as actual stroke amount.

(3) Flowchart

Figure 4:
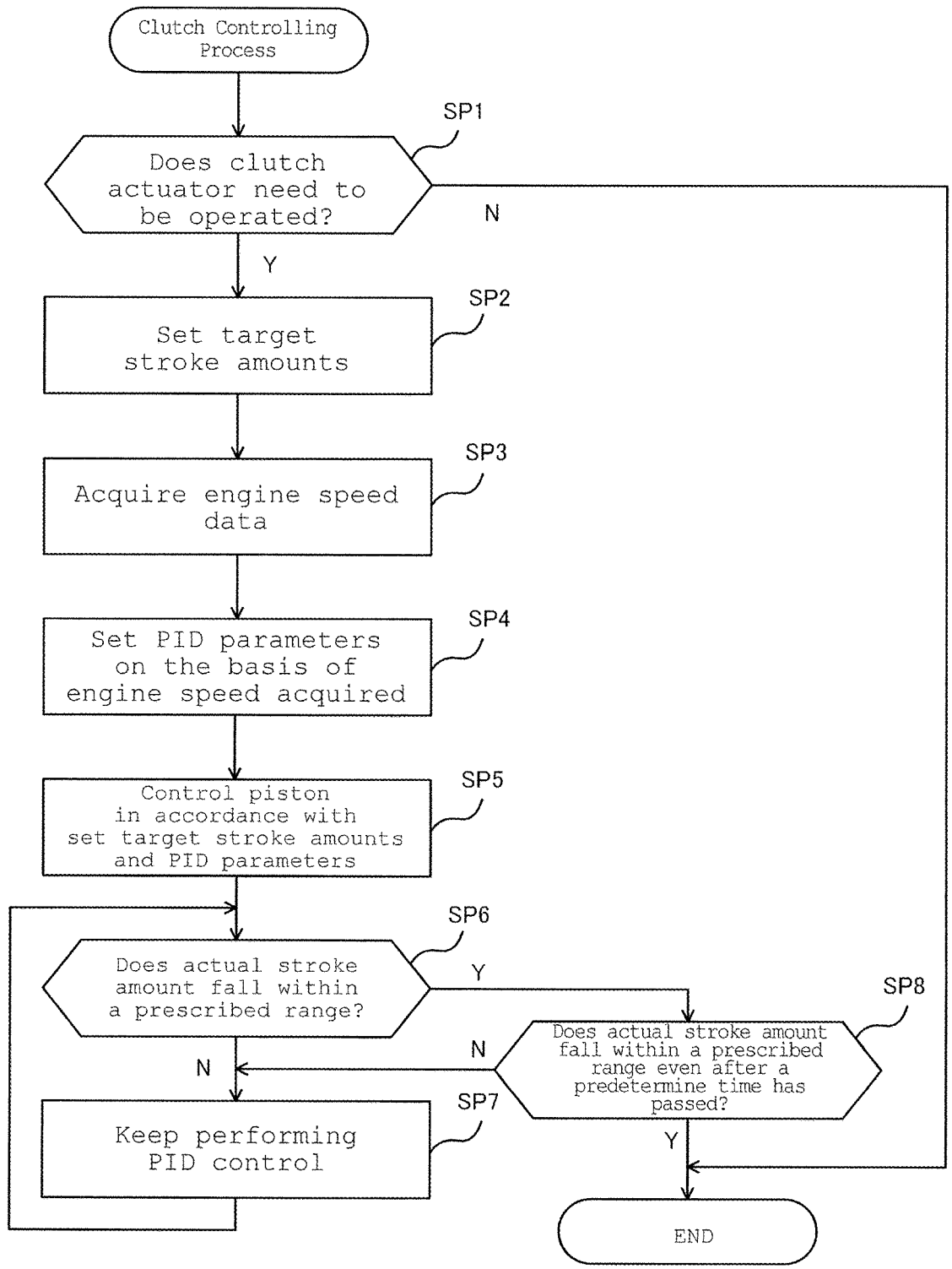
FIG. 4 is a flow chart explaining the clutch control process.

FIG. 4 is a flowchart explaining the clutch control process performed in this embodiment. The clutch control is performed, as needed, by the processor 151 of the clutch control device 15 after the engine 14 is turned on. For simplicity of explanation, the clutch control shall be explained as performed by the clutch control device 15.

The process of controlling the clutch 19 will be described on the assumption that the clutch 19 should be switched from the connected state to the disconnected stated. To switch the clutch 19 from the disconnected state to the connected state, a similar process shall be performed.

First, the clutch control device 15 determines whether the clutch actuator 18 needs to be operated or not (SP1). If the clutch control device 15 receives, for example, an operation-instructing signal from the ECU 13, it determines that the clutch actuator 18 should be operated. If the clutch control device 15 receives a position signal from the change lever unit 11, it determines that some operation should be performed.

If NO in Step SP1 (SP1: N), it is determined that the clutch 19 need not be disconnected. Then, the clutch control device 15 terminates the process. On the other hand, if YES in Step SP1 (SP1: Y), the clutch control device 15 sets target stroke amounts (SP2).

The target stroke amounts set in Step SP2 are a stroke amount (final target stroke amount) which the piston 186 must have at the position where the clutch 19 is disconnected, and a stroke amount (intermediate target stroke amount) which is smaller than the final target stroke amount.

Next, the clutch control device 15 receives data representing the engine speed from a sensor (not shown), the ECU 13, or the like (SP3), and sets PID parameters on the basis of the engine speed (SP4). The clutch control device 15 then PID-controls the piston 186 in accordance with the target stroke amounts and PID parameters which have been set in order to match the actual stroke amount with the target stroke amounts (SP5).

In practice, the clutch control device 15 receives the actual stroke amount from the sensor 21 and calculates the stroke amount designated, from the difference between the actual stroke amount and the intermediate target stroke amount. The clutch control device 15 then converts the designated stroke amount into a valve drive signal, and outputs the valve drive signal to the clutch actuator 18.

The clutch actuator 18, which has received the valve drive signal from the clutch control device 15, changes the opening of any one of the solenoid valves 181 to 184 or the openings of all the solenoid valves 181 to 184, in accordance with the valve drive signal. Air is thereby supplied from the air tank 20 or is released outside. As a result, the piston 186 moves in the axial direction, and the actual stroke amount approaches the intermediate target stroke amount.

Next, the clutch control device 15 calculates the designated stroke amount from the difference between the actual stroke amount and the final target stroke amount. The clutch control device 15 then converts the designated stroke amount to a valve drive signal. The valve drive signal is output to the clutch actuator 18.

The clutch actuator 18, which has received the valve drive signal from the clutch control device 15, changes the opening of any one of the solenoid valves 181 to 184 or the openings of all the solenoid valves 181 to 184, in accordance with the valve drive signal. Air is thereby supplied from the air tank 20 or is released outside. As a result, the piston 186 moves in the axial direction, and the actual stroke amount finally approaches the final target stroke amount.

Thus, the clutch control device 15 controls the motion of the piston 186 in a stepwise manner, first making the actual stroke amount match the intermediate stroke amount and then making the actual stroke amount match the final target stroke amount.

Next, the clutch control device 15 determines whether the actual stroke amount falls within a prescribed range (SP6). The prescribed range is, for example, a range between the smallest value and the largest value obtained by adding and reducing a specific amount to and from the final target stroke amount, respectively.

If NO in Step P6 (SP6: N), the clutch control device 15 keeps performing the PID control (SP7). If YES in Step S6 (SP6: Y), the clutch control device 15 determines whether the actual stroke amount falls within the prescribed range even after a predetermined time has passed (SP8).

If NO in Step SP8 (SP8: N), the clutch control device 15 goes to Step SP7 and keeps performing the PID control (SP7). If YES in Step SP8 (SP8: Y), the clutch control device 15 determines that the clutch 19 has been disconnected. Then, the process is terminated.

(4) Timing Chart

Figure 5:
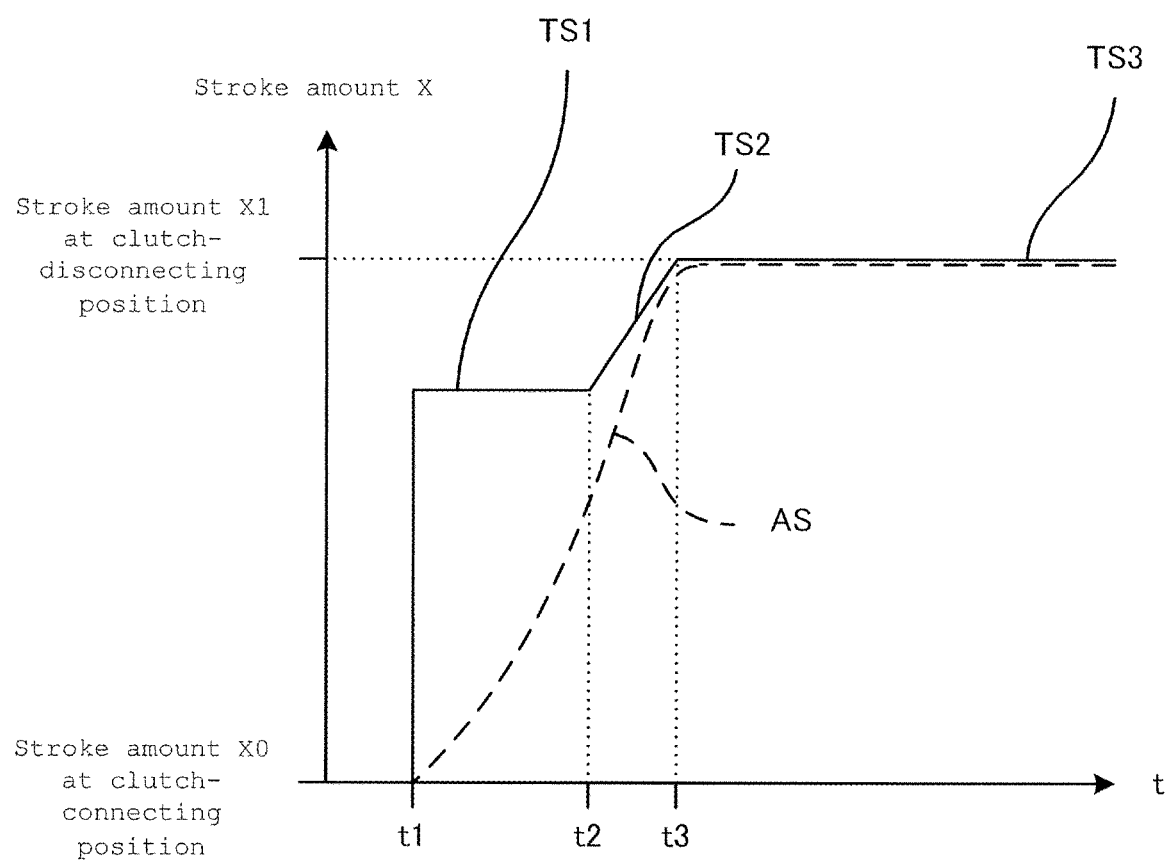
FIG. 5 is a timing chart of target stroke amounts and the actual stroke amount.

FIG. 5 is a timing chart of the target stroke amounts T1 to T3 and the actual stroke amount AS. Plotted on the axis of abscissa is time t. Time t1 is a point at which the clutch control device 15 starts controlling the clutch actuator 18. Time t2 is a point at which a prescribed time has elapsed from time t1. Time t3 is a point at which another prescribed time has elapsed from time t2.

Plotted on the axis of ordinate is the stroke amount X of the piston 186 of the clutch actuator 18. Stroke amount X0 is the stroke amount that corresponds to the connection position of the clutch 19. Stroke amount X1 corresponds to the disconnection position of the clutch 19.

First intermediate target stroke amount TS1 is set for first time T1 between time t1 and time t2. The clutch control device 15 controls the stroke amount of the piston 186, thereby to make the actual stroke amount AS approach the first intermediate target stroke amount TS1.

Second intermediate target stroke amount TS2 is set for second time T2 between time t2 and time t3. The second intermediate target stroke amount TS2 changes from time to time. The clutch control device 15 controls the stroke amount of the piston 186, thereby to make the actual stroke amount AS approach the second intermediate target stroke amount TS2.

The final target stroke amount TS3 is set at time t3, and remains set thereafter. The clutch control device 15 controls the stroke amount of the piston 186 to make the actual stroke amount AS approach the final target stroke amount TS3. Upon the lapse of a prescribed time, the actual stroke amount may be close to the final target stroke amount TS3. If this is the case, the PID control is stopped.

The first intermediate target stroke amount TS1 and the second intermediate target stroke amount TS2 may be preset values. Since the clutch 19 will be disconnected at last in this embodiment, the first intermediate target stroke amount TS1 which is set first is smaller than the second intermediate target stroke amount TS2 which is set later.

Figure 6:
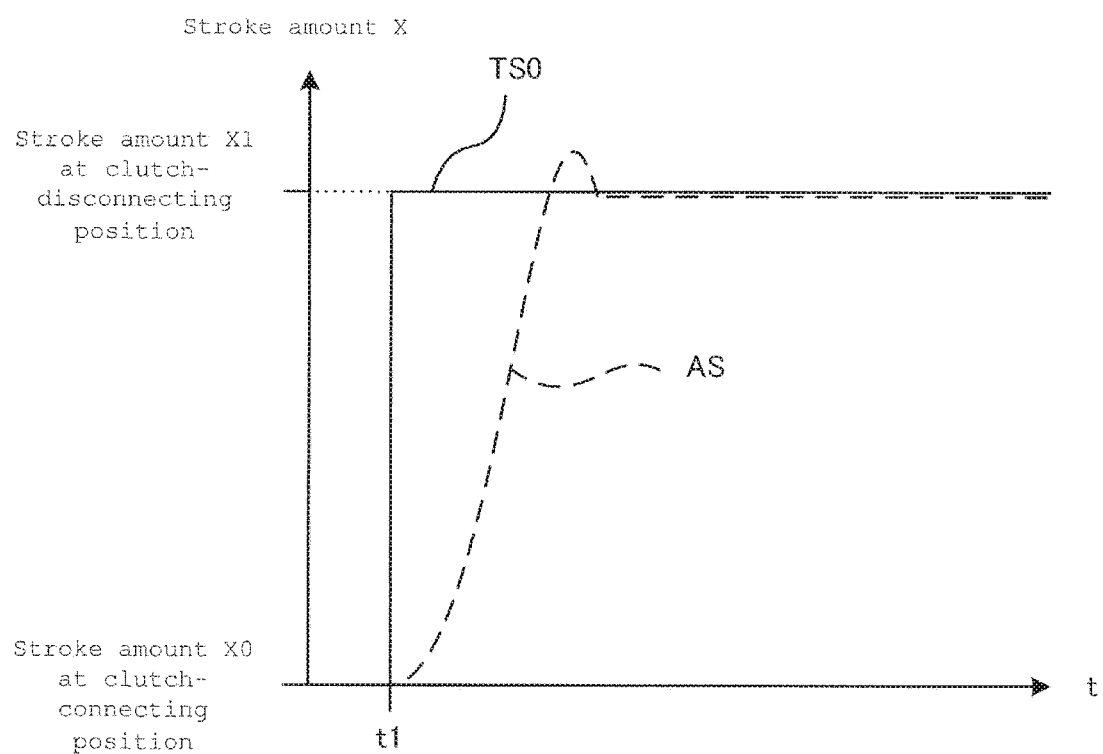
FIG. 6 is a timing chart of the target stroke amount set in a conventional device, and the actual stroke amount achieved therein.

FIG. 6 is a timing chart showing the target stroke amount TS0 set in a conventional method and the actual stroke amount AS achieved therein, in comparison with those set and achieved in this invention. In the conventional clutch control methods, one target stroke amount TS0 is set. The target stroke amount TS0 is a stroke amount that corresponds to the position X1 where the clutch 19 is disconnected. That is, the target stroke amount TS0 is identical to the stroke amount X1.

In this case, the actual stroke amount AS gradually increases from the control starting time t1, and exceeds (namely, overshoots) the target stroke amount TS0 upon the lapse of a prescribed time. The piston 186 is therefore moved longer than the stroke amount X1 necessary for disconnecting the clutch 19. In this case, an excessive load is exerted on the piston, inevitably wearing and damaging the piston.

(5) Advantages of the Embodiment

In the embodiment described above, the first intermediate target stroke amount TS1 and the second intermediate target stroke amount TS2 are set in addition to the final target stroke amount TS3 which corresponds to the position where the clutch 19 is disconnected. Further, the actual stroke amount AS is made to approach the first target stroke amount T1 and then to the second target stroke amount T2. Next, the actual stroke amount AS is made to approach the final target stroke amount TS3, and the clutch actuator 18 is controlled in a stepwise manner. The overshooting and undershooting of the actual stroke amount AS can therefore be suppressed. Hence, the clutch actuator 18 can be prevented from being worn or damaged.

(6) Other Embodiments

In the embodiment described above, the PID control controls the solenoid valves 181 to 184. The method of controlling the solenoid valves is not limited to this. Any other feedback control, such as H∞ control, may be employed to control the solenoid valves 181 to 184.

In the embodiment described above, the stroke amount that corresponds to the position where the clutch 19 is disconnected is set as final target stroke amount TS3, and the first and second intermediate target stroke amounts T1 and T2 are set in a stepwise manner. This invention is not limited to this. Third and fourth intermediate target stroke amounts, for example, may be set in addition to the first and second intermediate target stroke amounts T1 and T2. Still other intermediate target stroke amounts may be set. Moreover, the intermediate target stroke amounts may be changed.

In the embodiment described above, the second intermediate target stroke amount changes with time (namely, it gradually changes). Instead, the second intermediate target stroke amount may be set to a constant value as the first intermediate target stroke amount.

REFERENCE SIGNS LIST

1: Transmission system
15: Clutch control device
18: Clutch actuator
181 to 184: Solenoid valves
185: Air chamber
186: Piston
19: Clutch
20: Air tank
21: Sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clutch control device configured to control a pneumatic clutch actuator in order to connect and disconnect a clutch, comprising:
   an electronic control device operatively configured to execute processing to:
      set a stroke amount of a piston corresponding to a disconnecting position of the clutch as a final target stroke amount,
      set other stroke amounts different from the final target stroke amount as intermediate target stroke amounts, and
      control the piston in a stepwise manner such that an actual stroke amount of the piston is matched with the intermediate target stroke amounts and is thereafter matched with the final target stroke amount in order to disconnect the clutch.

2. The clutch control device according to claim 1, wherein PID parameters are set on the basis of engine speed at a time of connecting or disconnecting the clutch, and the piston is controlled in a stepwise manner on the basis of the final target stroke amount and intermediate target stroke amounts in order to disconnect the clutch.

3. The clutch control device according to claim 1, wherein the electronic control device is further operatively configured to execute processing to:
   determine whether the actual stroke amount is equal to the final target stroke amount, in accordance with whether the actual stroke amount falls within a prescribed range.

4. A clutch control method for use in a clutch control device configured to control a pneumatic clutch actuator in order to connect and disconnect a clutch, the method comprising the steps of:
- setting a stroke amount of a piston corresponding to a disconnecting position of the clutch as a final target stroke amount;
- setting other stroke amounts different from the final target stroke amount as intermediate target stroke amounts; and
- controlling the piston in a stepwise manner such that an actual stroke amount of the piston is matched with the intermediate target stroke amounts and is thereafter matched with the final target stroke amount, in order to disconnect the clutch.

* * * * *